US011651532B1

(12) United States Patent
Tremblay

(10) Patent No.: US 11,651,532 B1
(45) Date of Patent: May 16, 2023

(54) ASSISTED CREATION OF ARTISTIC DIGITAL IMAGES

(71) Applicant: COREL CORPORATION, Ottawa (CA)

(72) Inventor: Christopher Tremblay, Cantley (CA)

(73) Assignee: Corel Corporation, Ottawa (CA)

( * ) Notice: Subject to any disclaimer, the term of this patent is extended or adjusted under 35 U.S.C. 154(b) by 18 days.

(21) Appl. No.: 17/376,360

(22) Filed: Jul. 15, 2021

Related U.S. Application Data

(62) Division of application No. 16/935,566, filed on Jul. 22, 2020, now Pat. No. 11,475,613.

(51) Int. Cl.
| | |
|---|---|
| *G06T 11/20* | (2006.01) |
| *G06N 3/08* | (2006.01) |
| *G06T 11/00* | (2006.01) |
| *G06V 10/44* | (2022.01) |

(52) U.S. Cl.
CPC .............. *G06T 11/203* (2013.01); *G06N 3/08* (2013.01); *G06T 11/001* (2013.01); *G06V 10/44* (2022.01); *G06T 2200/24* (2013.01)

(58) Field of Classification Search
CPC ....... G06T 11/203; G06T 11/001; G06N 3/08; G06V 10/44
See application file for complete search history.

(56) References Cited

U.S. PATENT DOCUMENTS

| | | | |
|---|---|---|---|
| 6,097,853 A | 8/2000 | Gu et al. | |
| 2015/0310305 A1 | 10/2015 | Fang et al. | |
| 2018/0150947 A1 | 5/2018 | Lu et al. | |
| 2019/0138851 A1 | 5/2019 | Gray et al. | |
| 2020/0311990 A1* | 10/2020 | Chen | ..................... G06K 9/6215 |
| 2021/0004933 A1* | 1/2021 | Wong | ..................... G06T 7/248 |

* cited by examiner

*Primary Examiner* — Jacinta M Crawford
*Assistant Examiner* — Andrew Shin
(74) *Attorney, Agent, or Firm* — Rosenberg, Klein & Lee

(57) ABSTRACT

An example method of automated creation of artistic digital images comprises: producing a styled digital image by performing stylization of a source digital image based on a specified visual style; identifying a plurality of visual elements of the styled digital image; generating a sequence of digital paint coat layers for the styled digital image, wherein each digital paint coat layer of the sequence of digital paint coat layers covers at least a subset of the plurality of visual elements of the styled digital image, and wherein each digital paint coat layer of the sequence of digital paint coat layers comprises a set of graphic primitives; and producing an output digital image by generating respective sets of graphic primitives of each digital paint coat layer of the plurality of digital paint coat layers, wherein the output digital image exhibits one or more visual features of the visual style.

19 Claims, 5 Drawing Sheets

ASSISTED CREATION OF ARTISTIC DIGITAL IMAGES

CROSS-REFERENCE TO RELATED APPLICATIONS

This application claims the benefit of priority as a divisional application of U.S. Ser. No. 16/935,566 filed Jul. 22, 2020; the entire contents of which are incorporated herein by reference.

TECHNICAL FIELD

The present disclosure is generally related to computer systems, and is specifically related to systems and methods for assisted created of artistic digital images.

BACKGROUND

Digital image editing, or digital painting, applications are widely used for creating artistic digital content. A digital image editing application accepts the user's input via a graphical user interface (GUI) input device, such as a mouse and/or a stylus, and renders the resulting image on the screen.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for assisted creation of artistic digital images.

Various digital image editing applications provide certain functionality for assisting the user in creating artistic digital images. However, such functionality is usually limited to performing specific predefined actions upon the digital images being created or edited. Furthermore, such functionality often fail to relieve the user from significant efforts that are involved in artistic digital image creation.

The systems and methods of the present disclosure employ machine learning based models (also referred to as "trainable models") to implement fully-automated or assisted digital image creation workflows. A fully-automated digital image creation workflow produces artistic digital images by applying a chosen visual style to elements of source digital images, while allowing the user to provide additional control inputs to modify the resulting digital image. An assisted digital image creation workflow facilitates creation of artistic digital images by applying a chosen visual style to brush strokes and other graphic primitives specified by the user via a graphical user interface (GUI), as described in more detail herein below.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

Figure 1:
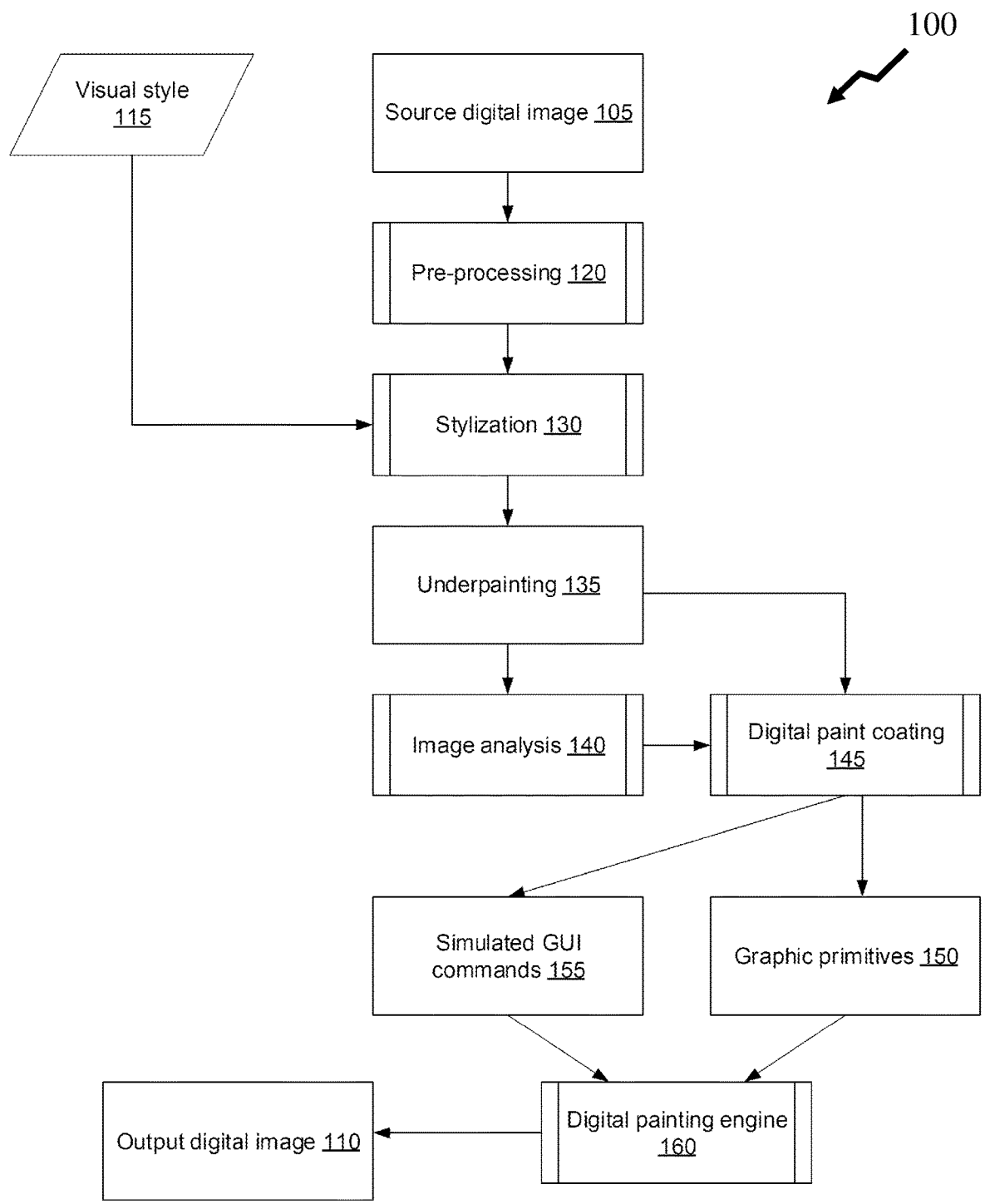
FIG. 1 schematically illustrates an example automated digital image creation workflow implemented in accordance with aspects of the present disclosure.

FIG. 1 schematically illustrates an example automated digital image creation workflow implemented in accordance with aspects of the present disclosure. The automated digital image creation workflow 100 processes the source digital image 105 and produces the output digital image 110, which exhibits one or more visual features of a chosen visual style 115. In various illustrative examples, the user may choose the visual style 115 via a graphical user interface (GUI) command, e.g., by selecting the desired visual style name from a menu of available visual styles, selecting from an image library one or more images representing the desired visual style, and/or specifying one or more parameters of the desired visual style.

In various illustrative examples, the source digital image 105 may be created by a digital image editing application or produced by a digital image acquiring device (e.g., an optical scanner or a photo camera), and may be fed to the workflow 100 via a suitable input interface (e.g., a graphical user interface (GUI), a peripheral device interface, a network interface, etc.).

After optional pre-processing by the pre-processing module 120, the source digital image 105 is fed to the stylization module 130. The pre-processing operations performed by the pre-processing module 120 may include edge-preserving blur and/or other digital image smoothing operations for removing the noise and/or visible digital image defects. In some implementations, various other digital image pre-processing operations may be performed.

The stylization module 130 may transform the source digital image 105 based on one or more parameters and/or sample images of the chosen visual style 115. The visual style sample images and/or visual style parameters may specify one or more textures, shapes, color palettes, and/or various other visual digital image aspects that characterize the selected visual style. Accordingly, the stylization module 130 may perform one or more digital image stylization operations, by employing trainable models (also referred to as "machine learning-based models") and/or rule-based stylization methods.

In an illustrative example, the stylization module 130 may perform color matching, which involves applying the visual style-specified color(s) to at least a subset of pixels of the source digital image. In another illustrative example, the stylization module 130 may preserve the source digital image colors, but apply the luminance values specified by the visual style (e.g., by one or more sample digital images of the visual style). In yet another illustrative example, the stylization module 130 may apply, to one or more fragments of the source digital image, one or more shapes specified by the visual style (e.g., by one or more sample digital images of the visual style). Applying a given shape to a fragment of digital image may involve applying, to the fragment, a homomorphic transformation that transforms the shape of the image fragment to the shape specified by the visual style (e.g., transforming a rectangular image fragment into a circular shape or vice versa). In some implementations, various other digital image stylization operations may be performed.

The styled digital image (also referred to as "underpainting") 135 produced by the stylization module 130 is fed to the digital image analysis module 140, which may employ one or more trainable models and/or rule-based methods for identifying various elements of the underpainting 135, including objects, faces, shapes, edges, background textures, foreground textures, and/or regions of interest. Two or more of the identified elements of the underpainting 135 may at least partially overlap.

In some implementations, the digital image analysis module 140 may perform one or more edge detection operations by computing color and/or luminance gradients of pixels of the underpainting 135. The detected edges can be utilized for determining the shape, size, and/or other parameters of the graphic primitives generated by the paint coating module 145, as described in more detail herein below. In some implementations, the detected edges can also be utilized for digital image segmentation based on identifying various objects, shapes, and/or regions of interest. In some implementations, one or more digital image segmentations operations may be performed by one or more trainable models (e.g., convolutional neural networks) configured to detect certain objects, shapes, and/or regions of interest.

The underpainting 135 and the output of the digital image analysis module 140 may be fed to the paint coating module 145, which generates a sequence of digital paint coat layers to be applied to the styled digital image. Each digital paint coat layer, which may at least partially cover one or more elements of the underpainting 135, specifies a set of graphic primitives 150 (e.g., brush stokes, fill patterns, or pixels) to be applied to those underpainting elements. Each graphic primitive may be characterized by one or more parameters, including the shape, the medium, the texture, and/or the color. The digital paint coat layers may be applied to the digital image in a pre-determined sequence, such that each digital paint coat layer (except for the first one) would be at least partially applied over one or more previous coat layers, thus simulating multiple coat layers in the physical world.

In some implementations, the paint coating module 145 may further generate a sequence of simulated GUI commands 155 (e.g., specifying the brush colors, patterns, positions, pressure, tilt, brush up and down operations) that would cause a digital painting engine (e.g., a digital image editing application) to implement the generated graphic primitives.

The generated graphic primitives and simulated GUI commands are fed, via an application programming interface (API), to the digital painting engine 160, thus causing it to perform the specified painting operations, which would result in producing the sequence of paint coats that form the output digital image 110. The digital painting engine 160 may further visually render the output digital image 110 via a GUI. In some implementations, the digital painting engine 160 may fully generate the output digital image 110 before rendering, thus optimizing the rendering speed. Alternatively, the paining engine 160 may sequentially render each generated brush stroke, thus simulating the digital image creation process by a human artist.

Figure 2:
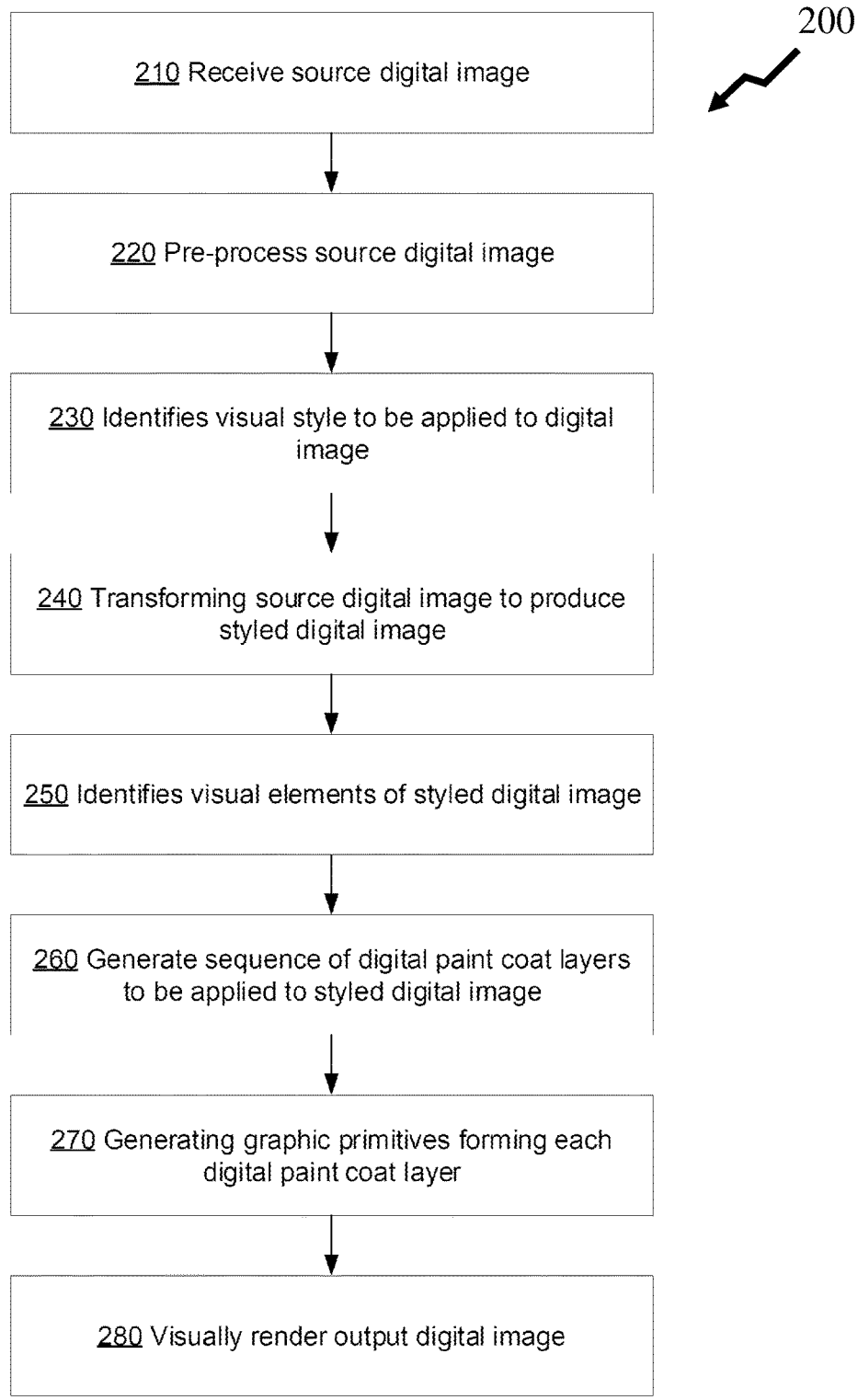
FIG. 2 depicts a flow diagram of an example method of automated digital image creation, in accordance with one or more aspects of the present disclosure.

FIG. 2 depicts a flow diagram of an example method 200 of automated digital image creation, in accordance with one or more aspects of the present disclosure. Method 200 may implement an automated digital image creation workflow, e.g., the example workflow 100 of FIG. 1. Method 200 and/or each of its individual functions, routines, subroutines, or operations may be performed by one or more processors of the computer system (e.g., computer system 1000 of FIG. 5) implementing the method. In some implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At block 210, the computer system implementing the method receives the source digital image. In various illustrative examples, the source digital image may be created by a digital image editing application or produced by a digital image acquiring device (e.g., an optical scanner or a photo camera), and may be received by the computer system via a suitable input interface (e.g., a graphical user interface (GUI), a peripheral device interface, a network interface, etc.).

At block 220, the computer system pre-processes the source digital image. The pre-processing may involve edge-preserving blur and/or other digital image smoothing operations for removing the noise and/or visible digital image defects.

At block 230, the computer system identifies the visual style to be applied to the source digital image. In various illustrative examples, the user may choose the visual style via a graphical user interface (GUI) command, e.g., by selecting the desired visual style name from a menu of available visual styles, selecting from an image library one or more images representing the desired visual style, and/or specifying one or more parameters of the desired visual style. The visual style sample images and/or visual style parameters may specify one or more textures, shapes, color palettes, and/or various other visual digital image aspects that characterize the selected visual style.

At block 240, the computer system produces a styled digital image by transforming the source digital image based on one or more parameters and/or sample images of the chosen visual style, as described in more detail herein above.

At block 250, the computer system identifies visual elements of the styled digital image. The visual elements may include objects, faces, shapes, edges, background textures, foreground textures, and/or regions of interest, as described in more detail herein above.

At block 260, the computer system generates a sequence of digital paint coat layers for the styled digital image. A digital paint coat layer, which may at least partially cover one or more elements of the visual styled image, specifies a set of graphic primitives (e.g., brush stokes, fill patterns, or pixels) to be applied to those underpainting elements. A graphic primitive may be characterized by one or more parameters, including the shape, the medium, the texture, and/or the color. The digital paint coat layers may be applied to the digital image in a pre-determined sequence, as described in more detail herein above.

At block 270, the computer system produces an output digital image by generating respective sets of graphic primitives of each digital paint coat layer. The resulting visual image would thus exhibit one or more visual features of the chosen visual style.

At block 280, the computer system visually renders the output digital image. In some implementations, the computer system may fully generate the output digital image before rendering, thus optimizing the rendering speed. Alternatively, the computer system may sequentially render each generated graphical primitive (e.g., each brush stroke), as described in more detail herein above. Upon completing the operations of block 280, the method terminates.

Figure 3:
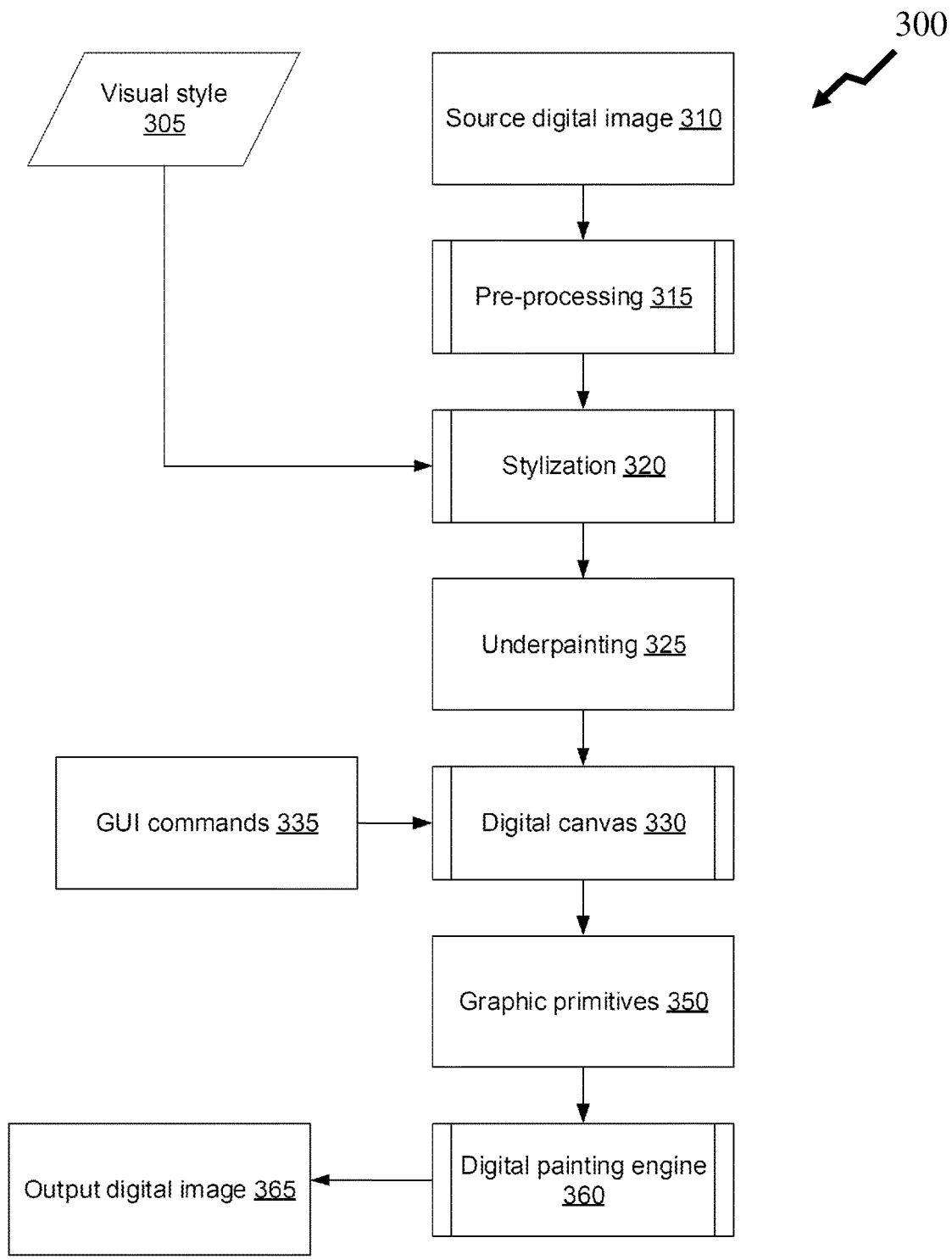
FIG. 3 schematically illustrates an example assisted digital image creation workflow implemented in accordance with aspects of the present disclosure.

FIG. 3 schematically illustrates an assisted digital image creation workflow implemented in accordance with aspects of the present disclosure. The assisted digital image creation workflow 300 facilitates creation of artistic digital images by applying a chosen visual style to brush strokes and other graphic primitives specified by the user via a graphical user interface (GUI). In various illustrative examples, the user may choose the visual style 305 via a graphical user interface (GUI) command, e.g., by selecting the desired visual style name from a menu of available visual styles, selecting from an image library one or more images representing the desired visual style, and/or specifying one or more parameters of the desired visual style.

In an illustrative example, the source digital image 310 may be created by the user via the GUI. In another illustrative example, the source digital image 310 may be produced by a digital image acquiring device (e.g., an optical scanner or a photo camera), and may be fed to the workflow 300 via a suitable input interface (e.g., a graphical user interface (GUI), a peripheral device interface, a network interface, etc.).

After optional pre-processing by the pre-processing module 315, the source digital image 310 is fed to the stylization module 320. The pre-processing operations performed by the pre-processing module 315 may include edge-preserving blur and/or other digital image smoothing operations for removing visible digital image defects. In some implementations, various other digital image pre-processing operations may be performed.

The stylization module 320 may transform the source digital image 310 based on one or more parameters and/or sample images of the chosen visual style 315. The visual style sample images and/or visual style parameters may specify one or more textures, shapes, color palettes, and/or various other visual digital image aspects that characterize the selected visual style. Accordingly, the stylization module 320 may perform one or more digital image stylization operations, by employing trainable models (also referred to as "machine learning-based models") and/or rule-based stylization methods.

In an illustrative example, the stylization module 320 may perform color matching, which involves applying the visual style-specified color(s) to at least a subset of pixels of the source digital image. In another illustrative example, the stylization module 320 may preserve the source digital image colors, but apply the luminance values specified by the visual style (e.g., by one or more sample digital images of the visual style). In yet another illustrative example, the stylization module 320 may apply, to one or more fragments of the source digital image, one or more shapes specified by the visual style (e.g., by one or more sample digital images of the visual style). Applying a given shape to a fragment of digital image may involve applying, to the fragment, a homomorphic transformation that transforms the shape of the image fragment to the shape specified by the visual style (e.g., transforming a rectangular image fragment into a circular shape or vice versa). In some implementations, various other digital image stylization operations may be performed.

The styled digital image (also referred to as "underpainting") 325 produced by the stylization module 320 may be exported into the digital canvas 330 rendered via the GUI. The user may digitally paint on the digital canvas 330 by an input device (e.g., a mouse or a stylus) generating a sequence of GUI commands 335, which may specify the brush colors, patterns, positions, pressure, tilt, brush up and down operations, etc.

The digital canvas 330 may process the underpainting and the GUI commands to generate a set of graphic primitives 335 (e.g., brush stokes, fill patterns, or pixels). Each graphic primitive may be characterized by one or more parameters, including the shape, the medium, the texture, and/or the color. Each graphic primitive 335 may be created based on a combination of one or more GUI commands 335 and one or more elements or parameters of the underpainting 325. In an illustrative example, the digital canvas 330 may generate a brush stroke based on the brush colors, patterns, positions, pressure, tilt, and/or other brush parameters specified by the GUI commands 335, and may further incorporate a group of pixels from the underpainting (e.g., using alpha mixing and/or other mixing methods). The underpainting pixels utilized for the mixing into the brush stroke may have the same image coordinates as the brush coordinates specified by the user via the GUI for generating the brush stroke. Two or more graphic primitives may at least partially overlap on the digital canvas, thus simulating brush strokes creating multiple coat layers in the physical world.

As the graphic primitives 350 are generated, they may be progressively fed, via an application programming interface (API), to a rendering engine 355, thus causing the rendering engine 355 to visually render, via the GUI, each generated graphic primitive 350 on the digital canvas, thus forming the output digital image 365, while visually simulating the image creation process by a human artist.

Figure 4:
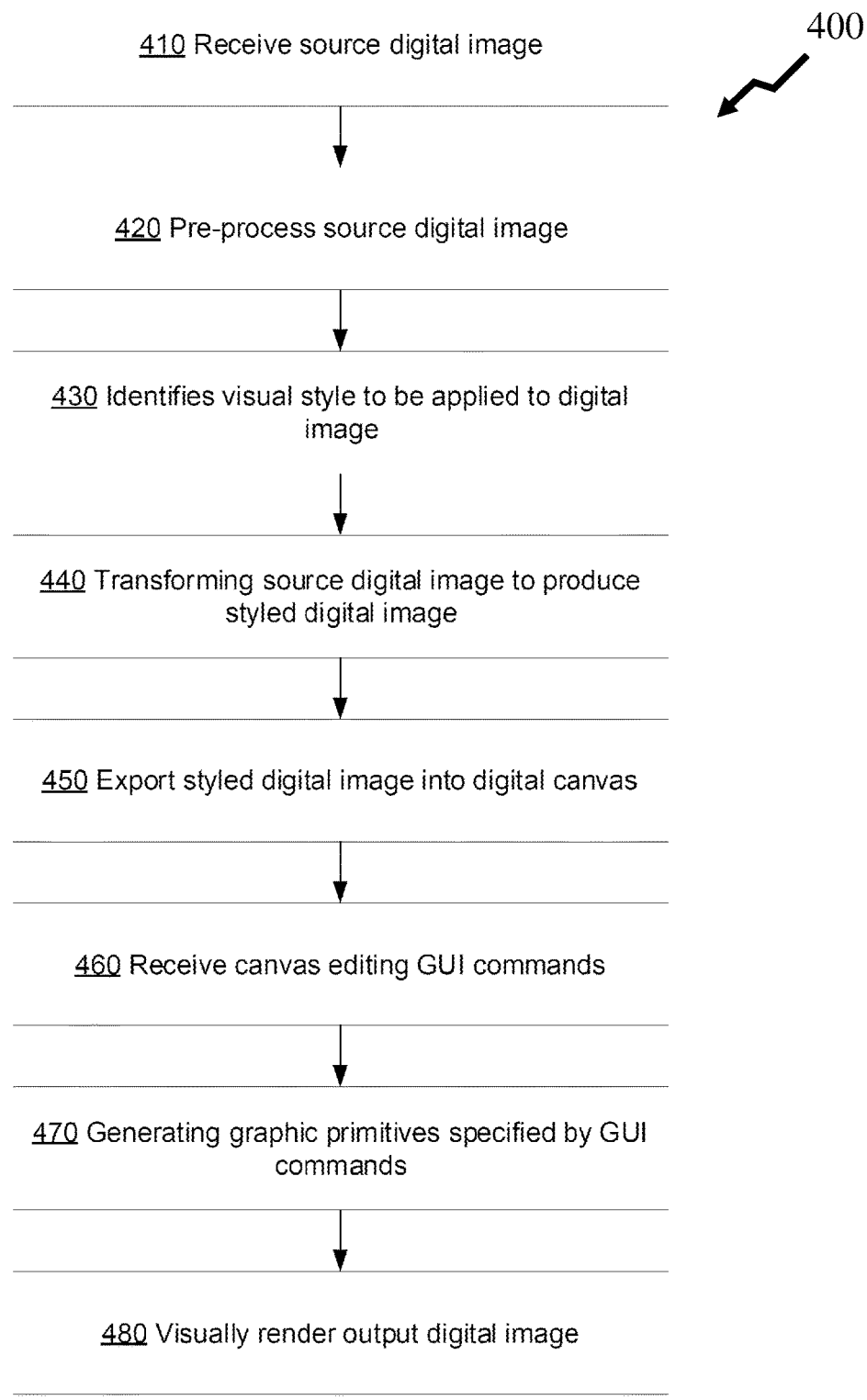
FIG. 4 depicts a flow diagram of an example method of assisted digital image creation, in accordance with one or more aspects of the present disclosure.

FIG. 4 depicts a flow diagram of an example method 400 of assisted digital image creation, in accordance with one or more aspects of the present disclosure. Method 400 and/or each of its individual functions, routines, subroutines, or operations may be performed by one or more processors of the computer system (e.g., computer system 1000 of FIG. 5) implementing the method. In some implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, the computer system implementing the method receives the source digital image. In various illustrative examples, the source digital image may be created by a digital image editing application or produced by a digital image acquiring device (e.g., an optical scanner or a photo camera), and may be received by the computer system via a suitable input interface (e.g., a graphical user interface (GUI), a peripheral device interface, a network interface, etc.).

At block 420, the computer system pre-processes the source digital image. The pre-processing may involve edge-preserving blur and/or other digital image smoothing operations for removing the noise and/or visible digital image defects.

At block 430, the computer system identifies the visual style to be applied to the source digital image. In various illustrative examples, the user may choose the visual style via a graphical user interface (GUI) command, e.g., by selecting the desired visual style name from a menu of available visual styles, selecting from an image library one or more images representing the desired visual style, and/or specifying one or more parameters of the desired visual style. The visual style sample images and/or visual style parameters may specify one or more textures, shapes, color palettes, and/or various other visual digital image aspects that characterize the selected visual style.

At block 440, the computer system produces a styled digital image by transforming the source digital image based on one or more parameters and/or sample images of the chosen visual style, as described in more detail herein above.

At block 450, the computer system exports the styled digital image into the digital canvas rendered via the GUI.

At block 460, the computer system receives one or more GUI commands (e.g., mouse or stylus inputs) specifying one or more parameters of graphic primitives to be rendered on the canvas (e.g., the brush colors, patterns, positions, pressure, tilt, brush up and down operations, etc.).

At block 470, the computer system generates the specified graphic primitives. Each graphic primitive may be created based on a combination of the graphic primitive parameters specified by the GUI commands received at block 450 and one or more elements or parameters of the styled digital image. In an illustrative example, the computer system may generate a brush stroke based on the brush colors, patterns, positions, pressure, tilt, and/or other brush parameters specified by the GUI commands, and may further incorporate a group of pixels from the visual styled image (e.g., using alpha mixing and/or other mixing methods). The visual styled image pixels utilized for the mixing into the brush stroke may have the same image coordinates as the brush coordinates specified by the user via the GUI for generating the brush stroke. In another illustrative example, the computer system may modify, based on the color(s) of a group of pixels of the styled digital image, at least one graphic primitive generated based on the graphic primitive parameters specified by the GUI commands. In yet another illustrative example, the computer system may modify, based the luminance value(s) of a group of pixels of the styled digital image, at least one graphic primitive generated based on the graphic primitive parameters specified by the GUI commands.

At block 480, the computer system sequentially renders the generated graphic primitives on the digital canvas, thus forming the output digital image. Upon completing the operations of block 480, the method terminates.

Figure 5:
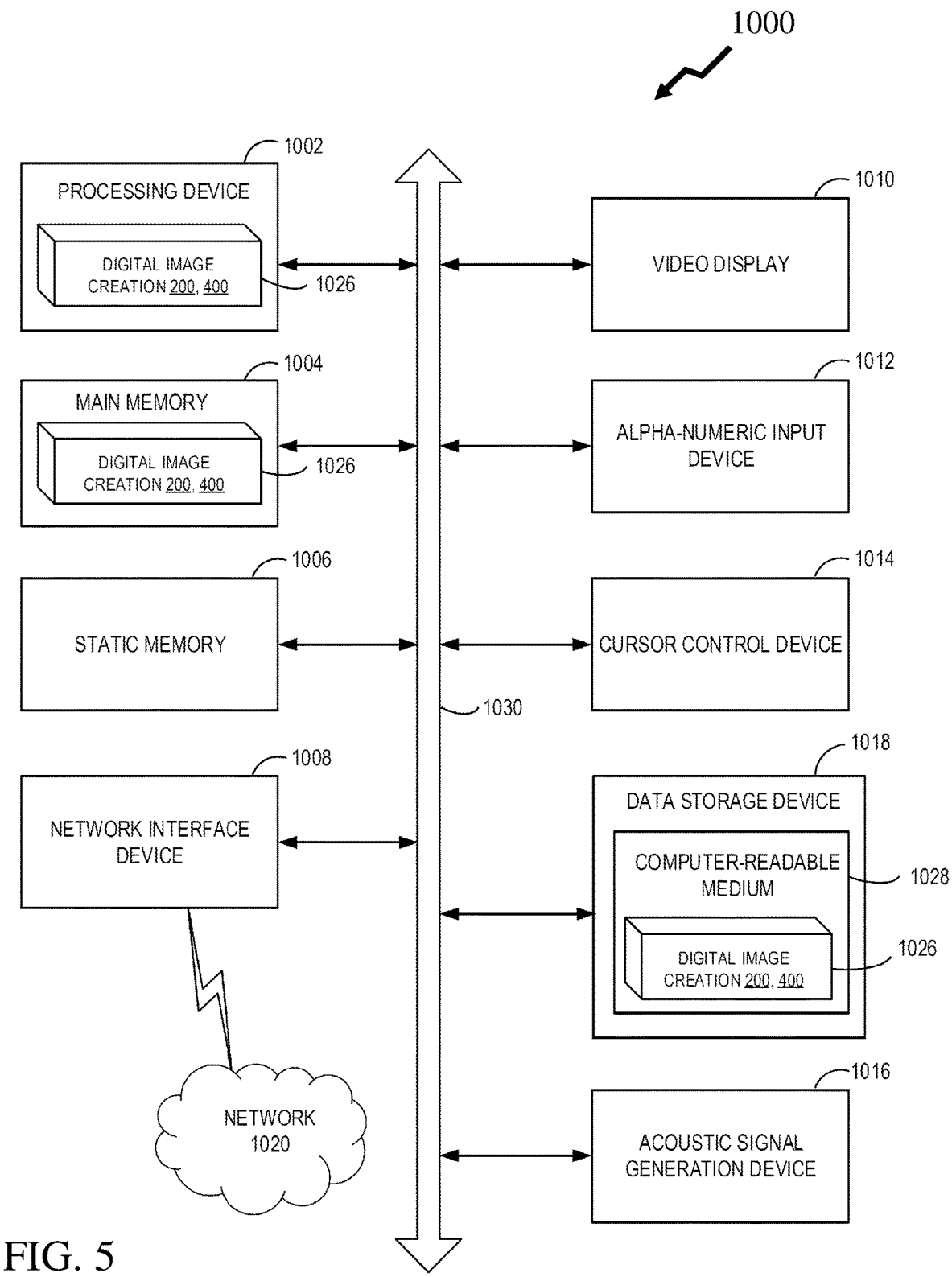
FIG. 5 depicts a block diagram of an example computer system operating in accordance with one or more aspects of the present disclosure.

FIG. 5 schematically illustrates a component diagram of an example computer system 1000 which may perform any one or more of the methods described herein. Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a mobile communication device (such as a smartphone), a notebook computer, a desktop computer, a server computer, a network appliance, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing method 200 of automated digital image creation and or method 300 of assisted digital image creation, in accordance with one or more aspects of the present disclosure.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of method 200 of automated digital image creation and or method 300 of assisted digital image creation, in accordance with one or more aspects of the present disclosure.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required operations, functions, or methods. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   receiving, by a computer system, a source digital image;
   receiving, by the computer system, an indication from a user relating to a specified visual style;
   producing a styled digital image by performing stylization of the source digital image based on the specified visual style;
   identifying a plurality of visual elements of the styled digital image;
   generating a sequence of digital paint coat layers for the styled digital image; and
   producing an output digital image by generating respective sets of graphic primitives of each digital paint coat layer of the plurality of digital paint coat layers; wherein
   the output digital image exhibits one or more visual features of the visual style;
   each digital paint coat layer of the sequence of digital paint coat layers covers at least a subset of the plurality of visual elements of the styled digital image,
   each digital paint coat layer of the sequence of digital paint coat layers comprises a set of graphic primitives;
   the stylization comprises applying a given shape to a fragment of the source digital image by applying a homomorphic transformation to the fragment; and
   the given shape is associated with the specified visual style.

2. The method according to claim 1, wherein
   receiving the indication from the user of the specified visual style comprises the user selecting one or more other images from an image library; and
   each other image of the selected one or more other images employs the specified visual style.

3. The method according to claim 1, further comprising pre-processing the source digital image prior to performing the stylization; wherein
   the pre-processing removes visible defects within the source digital image.

4. The method according to claim 1, wherein
   the stylization of the source digital image is performed using one or more machine learning based models.

5. The method according to claim 1, wherein
   the stylization of the source digital image is performed by one or more rule-based stylization processes.

6. A method, comprising:
   receiving, by a computer system, a source digital image;
   receiving, by the computer system, an indication from a user relating to a specified visual style;
   producing a styled digital image by performing stylization of the source digital image based on a specified visual style;
   exporting the styled digital image into a digital canvas;
   receiving, via a graphical user interface (GUI), one or more GUI commands specifying a set of graphic primitives to be rendered on the digital canvas;
   generating the specified set of graphic primitives;

visually rendering an output digital image comprising the set of graphic primitives; wherein the output digital image exhibits one or more visual features of the visual style;

the stylization comprises applying a given shape to a fragment of the source digital image by applying a homomorphic transformation to the fragment; and the given shape is associated with the specified visual style.

7. The method according to claim 6, wherein visually rendering the output digital image further comprises rendering the styled digital image as an underpainting to the set of graphic primitives.

8. The method of claim 6, wherein producing the styled digital image by performing stylization of the source digital image based on the specified visual style comprises:

identifying a plurality of visual elements of the styled digital image;

generating a sequence of digital paint coat layers for the styled digital image; and producing an output digital image by generating respective sets of graphic primitives of each digital paint coat layer of the plurality of digital paint coat layers, the output digital image exhibits one or more visual features of the visual style;

each digital paint coat layer of the sequence of digital paint coat layers covers at least a subset of the plurality of visual elements of the styled digital image, and each digital paint coat layer of the sequence of digital paint coat layers comprises a set of graphic primitives.

9. The method according to claim 6, wherein receiving the indication from the user of the specified visual style comprises the user selecting one or more other images from an image library; and each other image of the selected one or more other images employs the specified visual style.

10. The method according to claim 6, further comprising pre-processing the source digital image prior to performing the stylization; wherein the pre-processing removes visible defects within the source digital image.

11. The method according to claim 6, wherein the stylization of the source digital image is performed using at least one of one or more machine learning based models and one or more rule-based stylization processes.

12. A method, comprising:

receiving, by a computer system, a source digital image;

receiving, by the computer system, an indication from a user relating to a specified visual style;

producing a styled digital image by performing stylization of the source digital image based on the specified visual style;

identifying a plurality of visual elements of the styled digital image;

generating a sequence of digital paint coat layers for the styled digital image; and producing an output digital image by generating respective sets of graphic primitives of each digital paint coat layer of the plurality of digital paint coat layers; wherein the output digital image exhibits one or more visual features of the visual style;

each digital paint coat layer of the sequence of digital paint coat layers covers at least a subset of the plurality of visual elements of the styled digital image, each digital paint coat layer of the sequence of digital paint coat layers comprises a set of graphic primitives;

receiving the indication from the user of the specified visual style comprises the user selecting one or more other images from an image library;

each other image of the selected one or more other images employs the specified visual style;

the stylization comprises applying a given shape to a fragment of the source digital image by applying a homomorphic transformation to the fragment; and the given shape is established in dependence upon the selected one or more other images employing the specified visual style.

13. A method, comprising:

receiving, by a computer system, a source digital image;

receiving, by the computer system, an indication from a user relating to a specified visual style;

producing a styled digital image by performing stylization of the source digital image based on the specified visual style;

identifying a plurality of visual elements of the styled digital image;

generating a sequence of digital paint coat layers for the styled digital image; and producing an output digital image by generating respective sets of graphic primitives of each digital paint coat layer of the plurality of digital paint coat layers; wherein the output digital image exhibits one or more visual features of the visual style;

each digital paint coat layer of the sequence of digital paint coat layers covers at least a subset of the plurality of visual elements of the styled digital image, each digital paint coat layer of the sequence of digital paint coat layers comprises a set of graphic primitives;

the sequence of digital paint coat layers for the styled digital image define an underpainting;

the underpainting is exported to a digital canvas rendered within a graphical user interface (GUI) of a software application; and the user or another user can digitally paint onto the underpainting using a sequence of GUI commands within the software application.

14. The method according to claim 13, wherein the digital painting generates a graphic primitive where the graphic primitive is established in dependence upon the sequence of GUI commands and at least one of an element and a parameter of the underpainting associated with a region of the underpainting associated with the digital painting.

15. The method according to claim 13, wherein the digital painting generates a set of graphic primitives where each graphic primitive of the set of graphic primitives is established in dependence upon the sequence of GUI commands and at least one of an element and a parameter of the underpainting associated with a region of the underpainting associated with the digital painting; and two or more graphic primitives of the set of graphic primitives may at least partially overlap wherein the partially overlapped portions of the two or more graphic primitives of the set of graphic primitives simulate multiple paint layers applied to a physical canvas.

16. A method, comprising:

receiving, by a computer system, a source digital image;

receiving, by the computer system, an indication from a user relating to a specified visual style;

producing a styled digital image by performing stylization of the source digital image based on a specified visual style;

exporting the styled digital image into a digital canvas;

receiving, via a graphical user interface (GUI), one or more GUI commands specifying a set of graphic primitives to be rendered on the digital canvas;

generating the specified set of graphic primitives; and visually rendering an output digital image comprising the set of graphic primitives; wherein the output digital image exhibits one or more visual features of the visual style;

receiving the indication from the user of the specified visual style comprises the user selecting one or more other images from an image library;

each other image of the selected one or more other images employs the specified visual style;

the stylization comprises applying a given shape to a fragment of the source digital image by applying a homomorphic transformation to the fragment; and the given shape is established in dependence upon the selected one or more other images employing the specified visual style.

17. A method, comprising:

receiving, by a computer system, a source digital image;

receiving, by the computer system, an indication from a user relating to a specified visual style;

producing a styled digital image by performing stylization of the source digital image based on a specified visual style;

exporting the styled digital image into a digital canvas;

receiving, via a graphical user interface (GUI), one or more GUI commands specifying a set of graphic primitives to be rendered on the digital canvas;

generating the specified set of graphic primitives; and visually rendering an output digital image comprising the set of graphic primitives; wherein the output digital image exhibits one or more visual features of the visual style;

the styled digital image exported into the digital canvas comprises a sequence of digital paint coat layers which define an underpainting;

the underpainting is rendered within a graphical user interface (GUI) of a software application; and the user or another user can digitally paint onto the underpainting using a sequence of GUI commands within the software application.

18. The method according to claim 17, wherein the digital painting generates a graphic primitive where the graphic primitive is established in dependence upon the sequence of GUI commands and at least one of an element and a parameter of the underpainting associated with a region of the underpainting associated with the digital painting.

19. The method according to claim 17, wherein the digital painting generates a set of graphic primitives where each graphic primitive of the set of graphic primitives is established in dependence upon the sequence of GUI commands and at least one of an element and a parameter of the underpainting associated with a region of the underpainting associated with the digital painting; and two or more graphic primitives of the set of graphic primitives may at least partially overlap wherein the partially overlapped portions of the two or more graphic primitives of the set of graphic primitives simulate multiple paint layers applied to a physical canvas.

* * * * *